No. 768,530. PATENTED AUG. 23, 1904.
C. B. KING.
LATCH.
APPLICATION FILED NOV. 3, 1903.
NO MODEL.
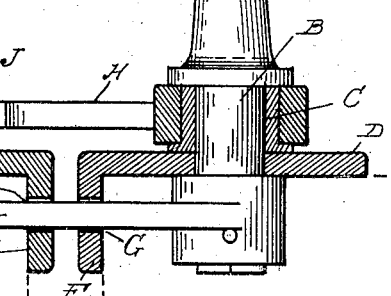
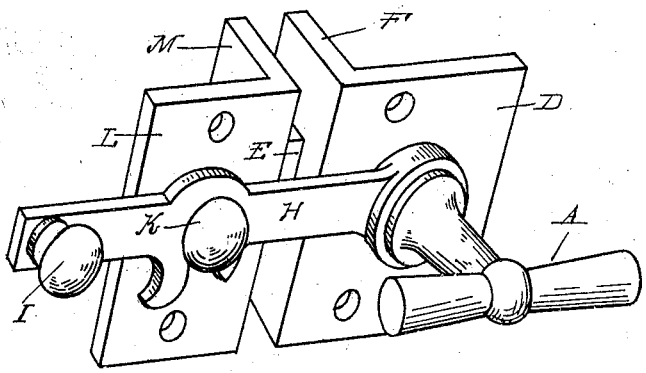

No. 768,530. Patented August 23, 1904.

UNITED STATES PATENT OFFICE.

CHARLES B. KING, OF DETROIT, MICHIGAN.

LATCH.

SPECIFICATION forming part of Letters Patent No. 768,530, dated August 23, 1904.

Application filed November 3, 1903. Serial No. 179,670. (No model.)

*To all whom it may concern:*

Be it known that I, CHARLES B. KING, a citizen of the United States, residing at Detroit, in the county of Wayne and State of Michigan, have invented certain new and useful Improvements in Latches, of which the following is a specification, reference being had therein to the accompanying drawings.

The invention relates to door-fastening devices, and is more particularly designed for use for securing the doors of the so-called "tonneau bodies" of motor-vehicles.

It is the object of the invention to obtain a simple compact construction and one which is free from all danger of accidental opening.

In the drawings, Figure 1 is a perspective view of my improved fastening device. Fig. 2 is a cross-section therethrough.

A is a handle, preferably of T form and having its shank B rotatively secured in a bearing C on the securing plate or fitting D.

E is a locking-bolt operatively connected with the shank B of the handle, so as to be projected and retracted by the turning of the handle A in opposite directions. As shown in Fig. 2, the bolt E is secured directly to the shank B on the inner face of the plate D. The plate D is also shown as being provided with an angle-flange F, which is slotted at G for the passage of the bolt in its rocking movement. Thus when the plate D is secured in position onto the door to be fastened the turning of the handle A will retract or project the bolt E so as to engage or disengage it from its keeper.

Secured to the plate D, and preferably pivoted upon the bearing C, is the member H. This is in the form of a hook, and its function is to form an auxiliary fastening device in addition to the bolt E. The member H is preferably provided with a knob I for operating it, and the hook is adapted to engage with a stationary lug or pin J, which has an enlarged head K. The lug J is preferably secured to a plate L, screwed or otherwise secured to the door-casing and provided with an angle-flange M, which is slotted at N to form a keeper for the bolt E.

With the construction described the door may be doubly secured, first, by engaging the bolt E with its keeper through the partial rotation of the handle A, and, second, by swinging the member H so as to engage the hook thereof with the lug J. These two fastening devices are independent of each other in operation, and thus the accidental disengagement of one will not affect the security of the other. In place of connecting the bolt E directly to the shank of the handle A it is evident that it may be operated from said handle by any suitable intermediate connection.

What I claim as my invention is—

1. A door-fastener comprising a rotatable handle, a bearing in which the shank of said handle is journaled, a bolt operatively connected with said shank and adapted to be projected or retracted by the rotation of said handle, and an auxiliary separately-operable locking member pivotally secured to said bearing.

2. A door-fastening device comprising a rotatable handle a bearing in which the shank of said handle is journaled, a bolt operatively connected with said shank adjacent to said bearing, and adapted to be reciprocated by the rotation of said handle, an auxiliary locking member loosely pivoted upon said bearing, and a keeper for engaging said bolt and auxiliary locking member.

3. A door-fastener comprising an angle-plate having a projecting apertured bearing, a rotatable handle having a shank journaled in said bearing, a locking-bolt operatively connected with said shank adjacent to the inner face of said angle-plate adapted to be projected and retracted through a slot in the angle-flange thereof, a hooked member pivoted on said projecting bearing, and an angle-plate having a slotted flange forming a keeper for said bolt and a headed pin adapted to be engaged by said hook.

4. A door-fastener comprising the plate having the slotted angle-flange F and the projecting apertured bearing C the rotatable handle having the shank B journaled in the bearing C, the bolt E secured to said shank upon the inner side of said plate D and adapted to be projected and retracted through the aperture in the flange F, the member H loosely pivoted in the bearing C, the angle-plate L slotted in alinement with the bolt E to form a keeper therefor, and a projecting pin J having the head K forming a keeper for the member H.

5. A door-fastener comprising two members for respectively connecting with the door and its casing, two independently-operable locking devices secured to one of said members and engaging with the other member, one of said devices being concealed and the other being exposed to view, and independent means for operating the locking devices.

6. A door-fastening comprising two angle-plates secured respectively to the door and its casing, and having their parallel flanges in proximity, a rotatable handle on one of said members, a bolt operatively connected with said handle and adapted to be projected through alined apertures in the adjacent flanges of said members, and a second securing device pivotally secured to the other flange of the member carrying the handle, and having a hook engagement with the other member.

In testimony whereof I affix my signature in presence of two witnesses.

CHARLES B. KING.

Witnesses:
JAS. P. BARRY,
H. C. SMITH.